(12) United States Patent
Liao et al.

(10) Patent No.: US 11,458,668 B2
(45) Date of Patent: *Oct. 4, 2022

(54) LUGGAGE WITH COMPOSITE MATERIAL INTEGRALLY FORMED FRAME AND MANUFACTURING METHOD THEREOF

(71) Applicant: QUEST COMPOSITE TECHNOLOGY LIMITED, Causeway Bay (HK)

(72) Inventors: Yuan-Hong Liao, Causeway Bay (HK); Su-Chun Wu, Causeway Bay (HK)

(73) Assignee: QUEST COMPOSITE TECHNOLOGY LIMITED, Causeway Bay (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/134,867

(22) Filed: Dec. 28, 2020

(65) Prior Publication Data

US 2022/0176612 A1 Jun. 9, 2022

(30) Foreign Application Priority Data

Dec. 4, 2020 (CN) .......................... 202011410557.4

(51) Int. Cl.
*B29C 51/10* (2006.01)
*B29C 51/00* (2006.01)
*B29C 51/14* (2006.01)
B29L 31/00 (2006.01)

(52) U.S. Cl.
CPC ............ *B29C 51/10* (2013.01); *B29C 51/002* (2013.01); *B29C 51/14* (2013.01); *B29L 2031/7418* (2013.01)

(58) Field of Classification Search
CPC ....... B29C 51/10; B29C 51/002; B29C 51/14; B29L 2031/7418
See application file for complete search history.

(56) References Cited

U.S. PATENT DOCUMENTS

| 5,132,166 A | * | 7/1992 | Adams | A45C 7/0045 190/125 |
| 10,981,339 B2 | * | 4/2021 | Liao | B29C 43/10 |
| 2017/0181512 A1 | * | 6/2017 | Liao | B32B 27/365 |

FOREIGN PATENT DOCUMENTS

TW M518022 U 3/2016

* cited by examiner

*Primary Examiner* — Monica A Huson
(74) *Attorney, Agent, or Firm* — Muncy, Geissler, Olds & Lowe, P.C.

(57) ABSTRACT

A method for manufacturing a luggage includes the steps: A) making a thermoplastic sheet into a shell, B) placing the shell body of the shell in an inner concave mold area of a heating mold and setting the shell edge of the shell to a frame mold area of the heating mold to correspond the outer surface of the shell to an inner wall surface of the heating mold, C) setting the outer surface of the thermoset carbon fiber plastic layer on the inner surface of the shell, D) setting the filling layer on the inner surface of the thermoset carbon fiber plastic layer within the frame mold area, E) expanding an air bag to the thermoset carbon fiber plastic layer and the filling layer and heating a heating mold, so that the shell, the thermoset carbon fiber plastic layer and the filling layer are combined with each other.

11 Claims, 7 Drawing Sheets

LUGGAGE WITH COMPOSITE MATERIAL INTEGRALLY FORMED FRAME AND MANUFACTURING METHOD THEREOF

BACKGROUND OF THE INVENTION

1. Field of the Invention

The present invention relates to carbon fiber products, in particular to a luggage with composite material integrally formed frame and a manufacturing method for manufacturing the luggage.

2. Description of the Related Art

The luggage currently on the market is usually made of thermoplastic or aluminum-magnesium alloy. For example, a luggage frame device disclosed in Taiwan utility model patent No. M518022 has two frame members, and each frame member is riveted on the periphery of two relatively closable and openable shells by means of rivet fixing. When the two shells are closed, the two frame members are engaged with each other. However, the manufacturing process of this type of luggage is more cumbersome, and when the luggage is larger, the aluminum frame is more likely to be deformed during the production or assembly (rivet) process, so that the accuracy of each frame is not easy to be controlled, which in turn leads to misalignment (inaccurate combination) of each frame when the two shells are closed.

SUMMARY OF THE INVENTION

The present invention has been accomplished under the circumstances in view. It is the main object of the present invention to provide a manufacturing a luggage with composite material integrally formed frame, which can obtain an integral shell and frame structure in a one-time mold forming process. The luggage made by this method has the functions of high strength, light weight and high precision, so as to increase the durability of the luggage and improve the fit of the two frames when the two shells are closed. In this way, it improves the drawbacks of complicated procedure and low combination accuracy of the prior art technique that uses bonding, riveting or stitching technology to combine the shells and the frames of the luggage.

To achieve this and other objects of the present invention, a manufacturing a luggage with composite material integrally formed frame comprises the steps of A) using a vacuum molding method to make a thermoplastic sheet into a shell that comprises a shell body, a shell edge disposed on an outer edge of the shell body and an accommodation area surrounded by the shell body and the shell edge; B) providing a heating mold that comprises an inner concave mold area, an inner wall surface and a frame mold area located at an outer edge of the inner concave mold area, and then placing the shell body in the inner concave mold area to set the shell edge in the frame mold area and to correspond an outer surface of the shell to the inner wall surface of the heating mold; C) providing a thermoset carbon fiber plastic layer and setting an outer surface of the thermoset carbon fiber plastic layer on an opposing inner surface of the shell; D) providing a filling layer and attaching the filling layer to an opposing inner surface of the thermoset carbon fiber plastic layer within the frame mold area; and E) setting an air bag in the accommodation area of the shell, and then expanding the air bag to the inner surface of the thermoset carbon fiber plastic layer and the filling layer, and then operating a heating mold to heat the shell body and the thermoset carbon fiber plastic layer in the inner concave mold area and the thermoset carbon fiber plastic layer and the filling layer in the frame mold area, so that he shell, the thermoset carbon fiber plastic layer and the filling layer are combined with each other.

Preferably, in step B) to step D), the frame mold area comprises an inner groove and an outer groove. The inner groove is adjacent to the inner wall surface of the heating mold and spaced apart from the outer groove. The shell edge of the shell is set in the inner groove. The thermoset carbon fiber plastic layer and the filling layer are set in the inner groove and the outer groove.

Preferably, in step C) and step D), the thermoset carbon fiber plastic layer is placed in the inner groove, and the filling layer is placed in the inner groove and the outer groove.

Preferably, the inner groove of the frame mold area is composed of a flat surface, an inclined surface and the inner wall surface of the heating mold. The flat surface has two opposite lateral sides thereof respectively connected to the inner wall surface and the inclined surface.

Preferably, in step B) to step D), the frame mold area comprises an inner bump, an outer bump and a recessed portion. The inner bump protrudes from the inner wall surface of the heating mold. The recessed portion is located between the inner bump and the outer bump. The shell edge of the shell and the thermoset carbon fiber plastic layer are placed on the inner bump and the recessed portion. The filling layer is placed on the recessed portion and the outer bump.

Preferably, the recessed portion of said frame mold area is mainly composed of a second inclined surface connected to a third inclined surface.

Preferably, the filling layer is thermosetting carbon fiber plastic.

Preferably, in step E), after the thermoset carbon fiber plastic layer and the filling layer are heated by the heating mold, the thermoset carbon fiber plastic layer and the filling layer are fused and cured and adhered to the inner surface of the shell.

Preferably, in step A), the thermoplastic sheet is a transparent material.

Preferably, in step A), the vacuum molding method is to provide a vacuum molding device with a mold, and then put the thermoplastic sheet into the vacuum molding device for heating and softening, so that the vacuum molding device generates a negative pressure to make the thermoplastic sheet adhere to the surface of the mold to form the shell.

Preferably, the method for manufacturing a luggage with composite material integrally formed frame further comprises step F) after step E) to move the air bag out of the accommodation area, and cool the integrated the first shell and first frame.

To achieve this and other objects of the present invention, a luggage made by using the method for manufacturing a luggage with composite material integrally formed frame comprises a first shell, a second shell openably assembled to the first shell, a first frame integrally formed with the first shell and located on an outer edge of the first shell, and a second frame integrally formed with the second shell and located on an outer edge of the second shell, so that when the first shell and the second shell are closed, the second frame is engaged in the first frame.

Preferably, the first shell and the second shell each comprise a shell and a thermoset carbon fiber plastic layer. The thermoset carbon fiber plastic layer is set on an inner surface of the shell.

Preferably, the first frame and the second frame each comprise a shell, a thermoset carbon fiber plastic layer and a filling layer. The thermoset carbon fiber plastic layer is set on an inner surface of the associating shell. The filling layer is set on an inner surface of the associating thermoset carbon fiber plastic layer.

Preferably, the first frame comprises a recessed engagement groove, and the second frame comprises a protruding engagement member engaged in the recessed engagement groove.

From the above we can see that the luggage with composite material integrally formed frame and manufacturing method thereof of the present invention can obtain an integral shell and frame structure in a one-time mold forming process. The luggage made by this method has the functions of high strength, light weight and high precision, so as to increase the durability of the luggage and improve the fit of the two frames when the two shells are closed.

The detailed structure and features provided by the present invention will be described in the detailed description of the subsequent embodiments. However, those with ordinary knowledge in the art should be able to understand that such detailed descriptions and specific embodiments listed in the present invention are only used to illustrate the present invention, but not to limit the scope of the patent application of the present invention.

DETAILED DESCRIPTION OF THE INVENTION

The applicant first explains here that throughout the specification, including the embodiments described below and the claims in the scope of the patent application, the nouns related to directionality are based on the directions in the drawings. Secondly, in the embodiments and drawings to be introduced below, the same element numbers represent the same or similar elements or their structural features.

Figure 1:
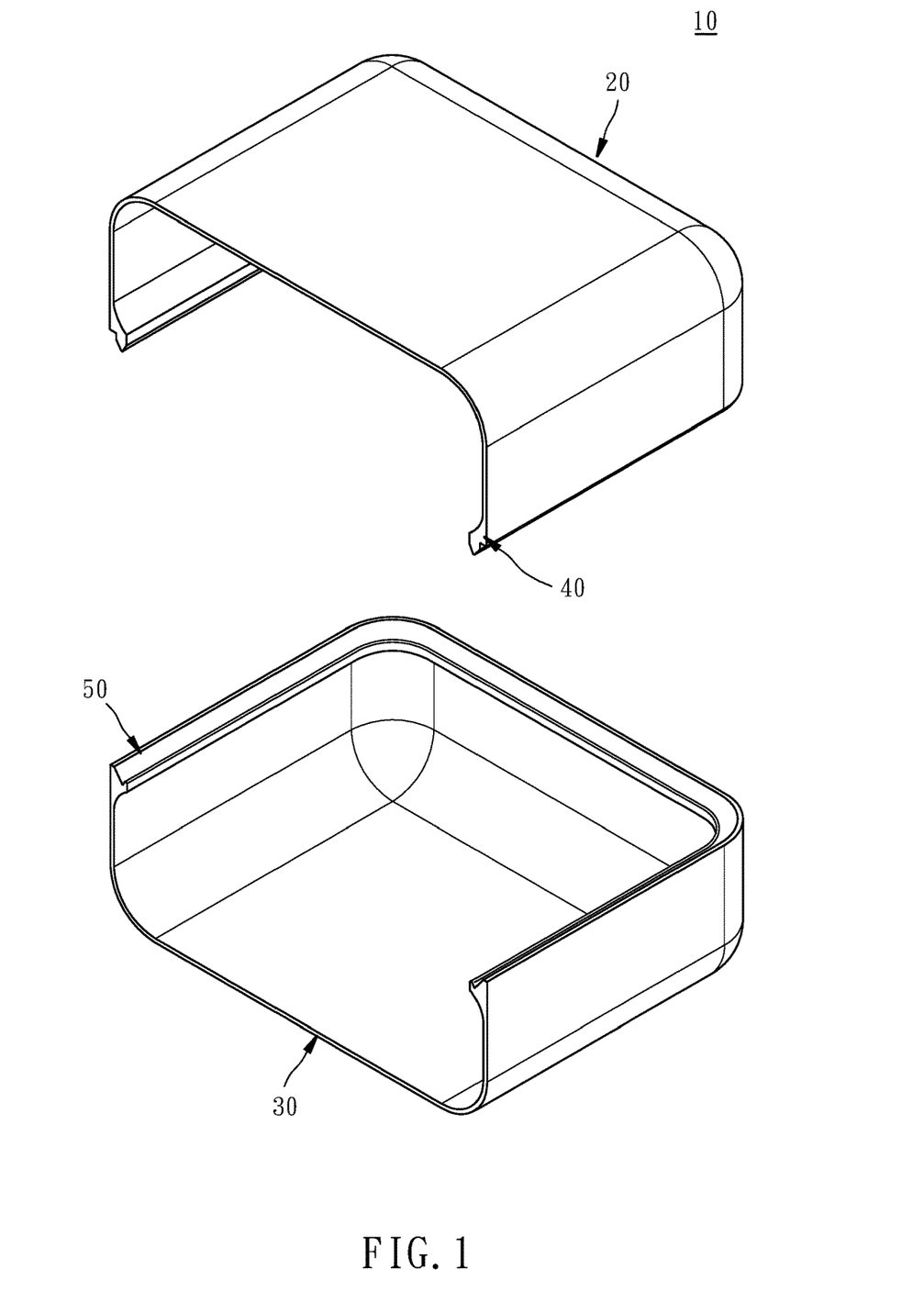
FIG. 1 is an exploded view of a luggage with composite material integrally formed frame in accordance with the present invention.
Figure 2:
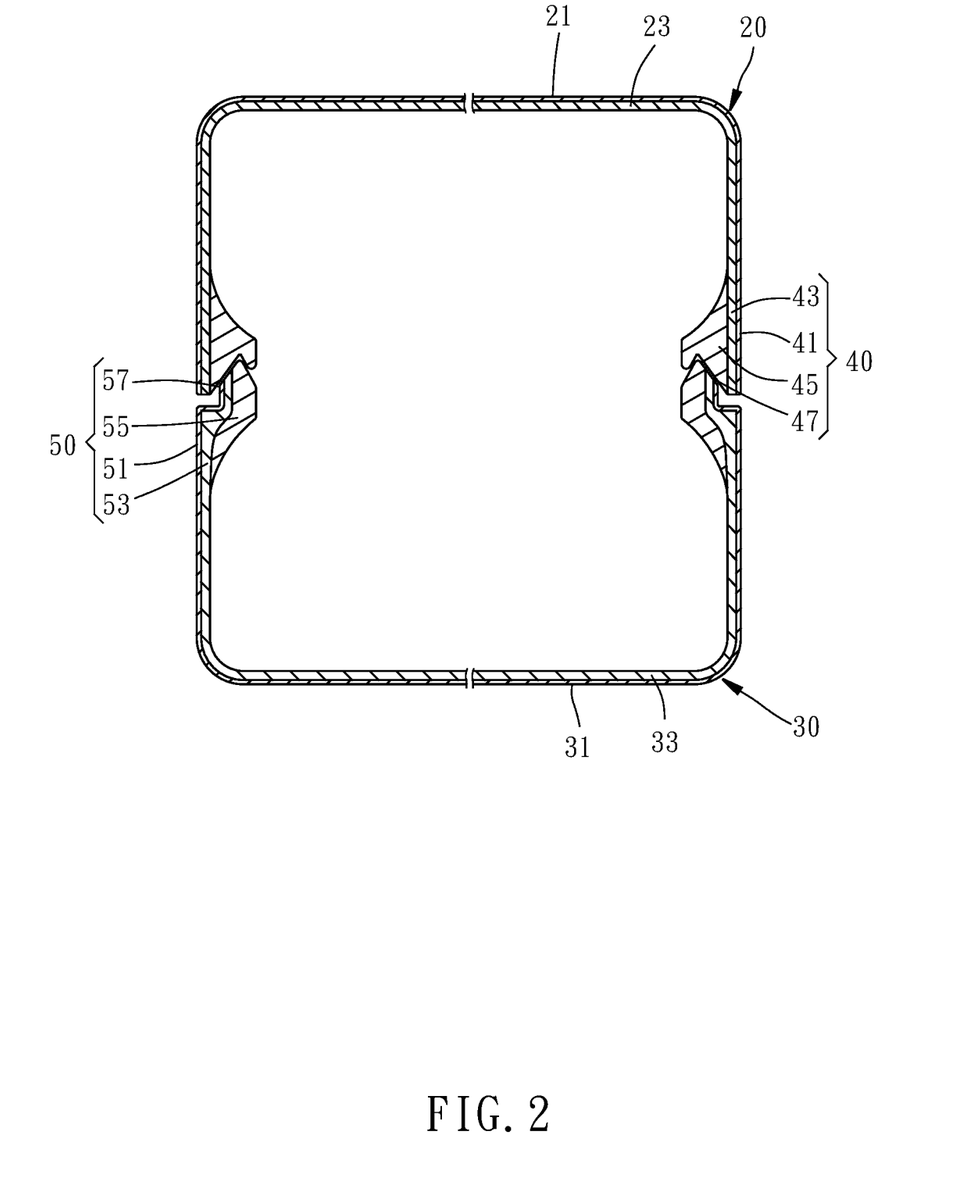
FIG. 2 is a sectional view of the luggage with composite material integrally formed frame in accordance with the present invention.

Referring to FIGS. 1 and 2, a luggage 10 with composite material integrally formed frame in accordance with the present invention comprises a first shell 20, a second shell 30, a first frame 40, and a second frame 50.

The first shell 20 comprises a shell 21 and a thermoset carbon fiber plastic layer 23, and the thermoset carbon fiber plastic layer 23 is provided on the inner surface of the shell 21.

The second shell 30 is openably assembled to the first shell 20. The second shell 30 comprises a shell 31 and a thermoset carbon fiber plastic layer 33, and the thermoset carbon fiber plastic layer 33 is provided on the inner surface of the shell 31.

The first frame 40 is integrated with the first shell 20 and is located on the outer edge of the first shell 20. The first frame 40 comprises a shell 41, a thermoset carbon fiber plastic layer 43, a filling layer 45 and a recessed engagement groove 47. The thermoset carbon fiber plastic layer 43 is provided on the inner surface of the shell 41. The filling layer 45 is provided on the inner surface of the thermoset carbon fiber plastic layer 43.

The second frame 50 is integrated with the second shell 30 and is located on the outer edge of the second shell 30. The second frame 50 comprises a shell 51, a thermoset carbon fiber plastic layer 53, a filling layer 55 and a protruding engagement member 57. The thermoset carbon fiber plastic layer 53 is provided on the inner surface of the shell 51. The filling layer 55 is provided on the inner surface of the thermoset carbon fiber plastic layer 53. When the first shell 20 and the second shell 30 are closed, the protruding engagement member 57 of the second frame 50 is engaged in the recessed engagement groove 47 of the first frame 40.

The manufacturing method for manufacturing the luggage 10 with composite material integrally formed frame in accordance with the present invention is divided into two parts, one is the manufacturing method of the first shell 20 and the first frame 40 being integrally formed, and the second is the manufacturing method of the second shell 30 and the second frame 50 being integrally formed.

Figure 3:
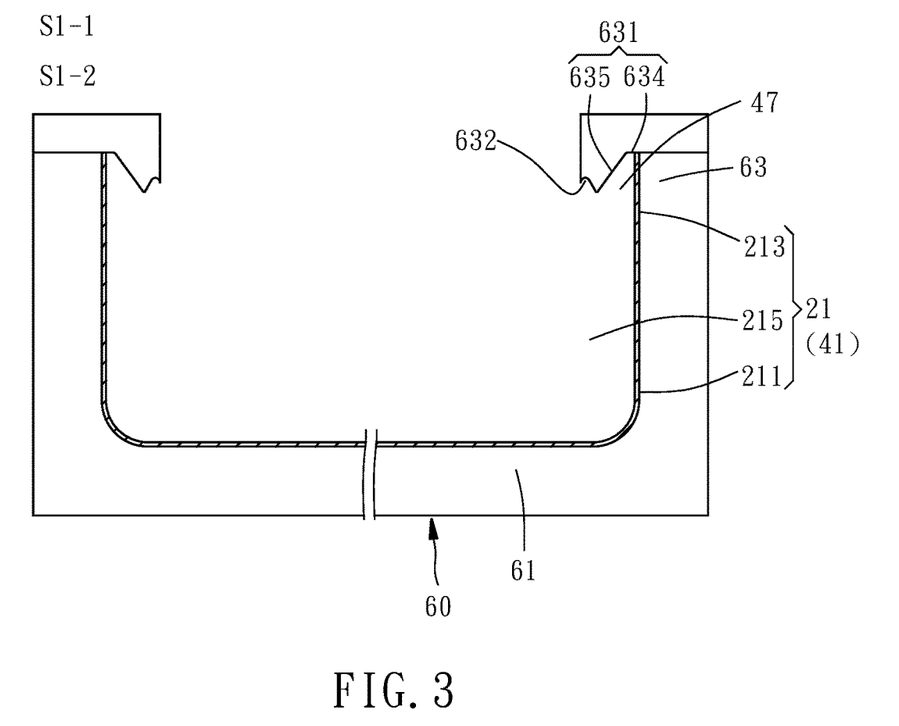
FIGS. 3 to 7 are schematic diagrams of the manufacturing method of the luggage with composite material integrally formed frame of the present invention, which shows the manufacturing process of the integrated first shell and first frame.

Referring to FIGS. 2-7, the manufacturing method of the first shell 20 and the first frame 40 being integrally formed comprises steps S1-1~S1-7, as follows:

Step S1-1: Referring to FIG. 3, use vacuum molding method to make a thermoplastic sheet into a shell 21, 41. The shell 21, 41 comprises a shell body 211, a shell edge 213 disposed on the outer edge of the shell body 211, and an accommodation area 215 surrounded by the shell body 211 and the shell edge 213. The thermoplastic sheet material is selected from PP (polypropylene), ABS resin (acrylonitrile butadiene styrene), PC (polycarbonate) or a combination thereof. Of course, other thermoplastics or combinations of thermoplastics are also covered by the present invention. The aforementioned vacuum molding method (also known as blister process) is to provide a vacuum molding device with a mold (not shown in the drawing), the mold is a male mold, and other auxiliary molds (such as ribs) can be set on the male mold to create shells of different shapes 21, 41. The process is to put the thermoplastic sheet into the vacuum molding device for heating and softening, and then the vacuum molding device generates negative pressure to make the thermoplastic sheet adhere to the surface of the mold to make the shell 21, 41. The technical content that the vacuum molding device heats and softens the thermoplastic sheet and generates negative pressure to attach the thermoplastic sheet to the surface of the mold to form a shell is a known technique and will not be repeated here.

Step S1-2: As shown in FIG. 3, provide a heating mold 60. The heating mold 60 comprises an inner concave mold area 61, a frame mold area 63 and an inner wall surface. The frame mold area 63 is located at the outer edge of the inner concave mold area 61 and has an inner groove 631 and an outer groove 632. The inner groove 631 is adjacent to the inner wall surface of the heating mold 60 and spaced apart from the outer groove 632. The inner groove 631 is mainly composed of a flat surface 634, a first inclined surface 635 and the inner wall surface of the heating mold 60. The flat surface 634 has two opposite lateral sides thereof respectively connected to the inner wall surface and the first inclined surface 635, and is used for making the recessed engagement groove 47. The shell body 211 is set in the inner concave mold area 61, and the shell edge 213 is set in the inner groove 631 of the frame mold area 63, and the outer surface of the shell 21, 41 corresponds to the inner wall surface of the heating mold 60. In addition, if you want to display a pattern (such as trademark or modeling pattern) on the shell 21, you can select a transparent thermoplastic sheet in step S1-1, and then make the thermoplastic sheet into shell 21, and in step S1-1 or step S1-2, a pattern is set on the inner surface of shell 21 by painting, printing or labeling.

Figure 4:
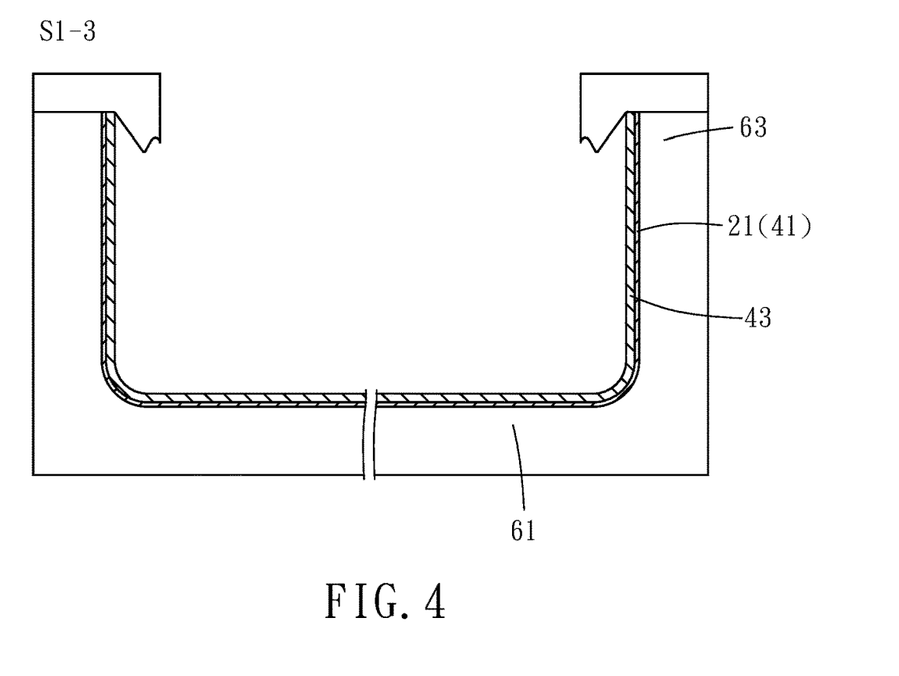

Step S1-3: As shown in FIG. 4, provide a thermoset carbon fiber plastic layer 43. The thermoset carbon fiber plastic layer 43 has an outer surface and an inner surface. Set the outer surface of the thermoset carbon fiber plastic layer 43 on the inner surface of the shell 21,41. Furthermore, a part of the thermoset carbon fiber plastic layer 43 will be placed in the inner concave mold area 61, and the other part will be placed in the inner groove 631 of the frame mold area 63 (or between the inner groove 631 and the outer groove 632). The thermoset plastic of the thermoset carbon fiber plastic layer 43 is selected from epoxy resin or polyester, of course, other thermoset plastics or combinations of thermoset plastics are also encompassed by the present invention.

Figure 5:
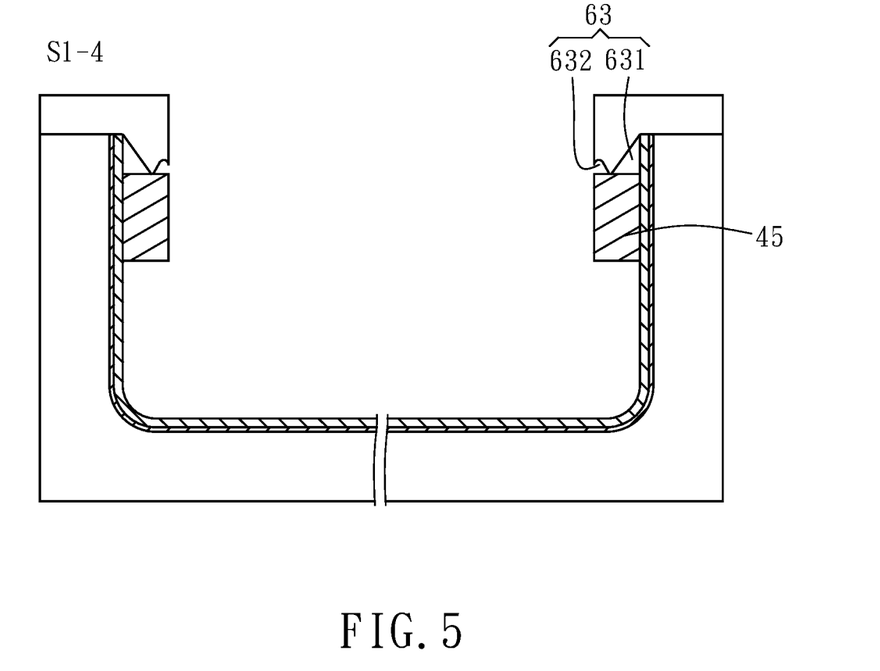

Step S1-4: As shown in FIG. 5, provide a filling layer 45. The filling layer 45 in this embodiment is a thermosetting carbon fiber plastic. The filling layer 45 is attached to the inner surface of the thermoset carbon fiber plastic layer 43 and located between the inner groove 631 and the outer groove 632 of the frame mold area 63 (or only the outer groove 632) to increase the amount of material at the frame.

Figure 6:
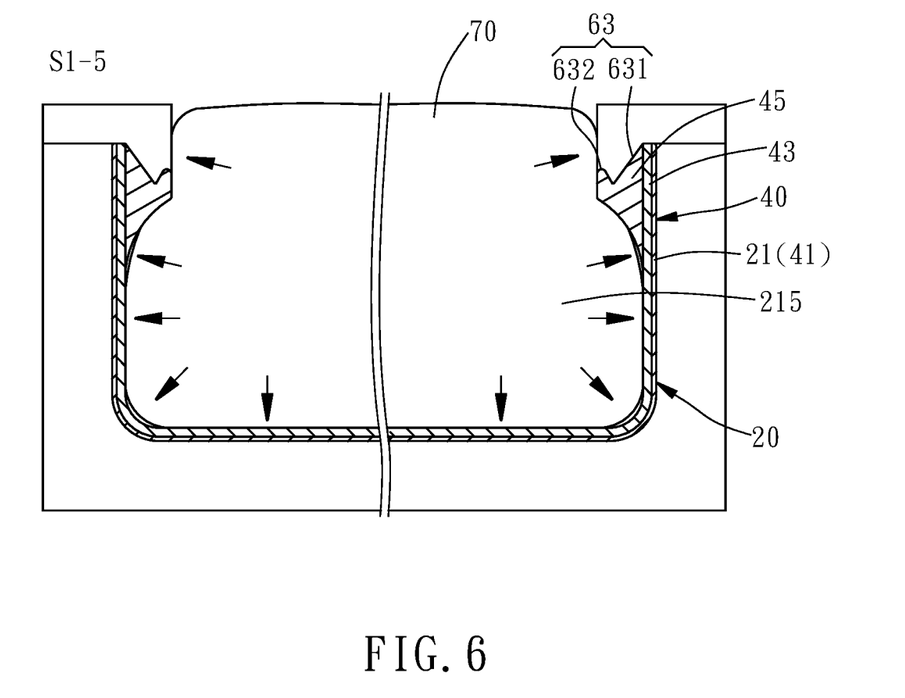

Step S1-5: As shown in FIG. 6, set an air bag 70 in the accommodation area 215 of the shell 21, 41, then expand the air bag 70 to the inner surface of the thermoset carbon fiber plastic layer 43 and the filling layer 45, and then operate the heating mold 60 to heat the shell body 211 and the thermoset carbon fiber plastic layer 43 in the inner concave mold area 61 and the thermoset carbon fiber plastic layer 43 and the filling layer 45 in the frame mold area 63, so that the shell 21, 41, the thermoset carbon fiber plastic layer 43 and the filling layer 45 are combined with each other and extruded into the inner groove 631 and the outer groove 632 of the frame mold area 63. The preferred heating temperature is between 140 degrees Celsius and 150 degrees Celsius, so that the thermoset carbon fiber plastic layer 43 and the filling layer 45 are cured and bonded to the inner surface of the shell 21, 41, and the shell 21, 41, the thermoset carbon fiber plastic layer 43 and the filling layer 45 are combined to form the first shell 20 and the first frame 40 in integrity.

Figure 7:
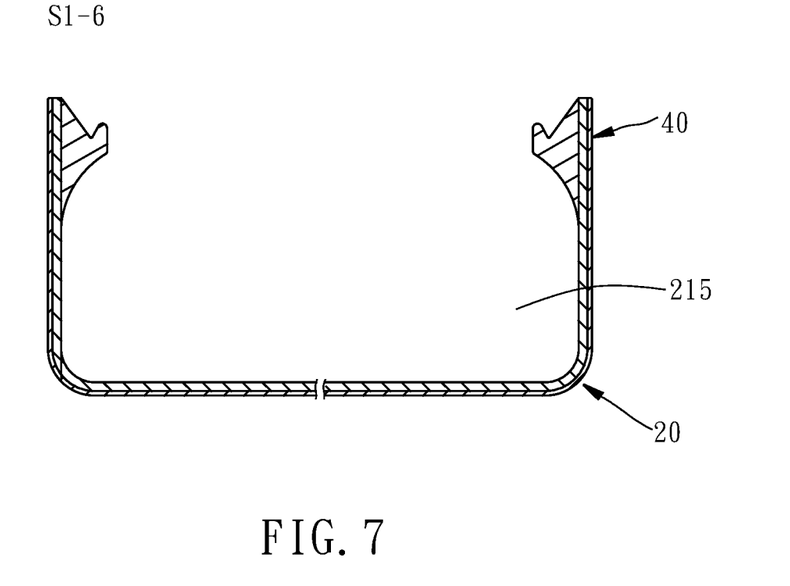

Step S1-6: As shown in FIG. 7, move the air bag 70 out of the accommodation area 215 of the shell, and cool the integrated first shell 20 and first frame 40 to complete the manufacturing process of the first shell 20 and first frame 40.

Figure 8:
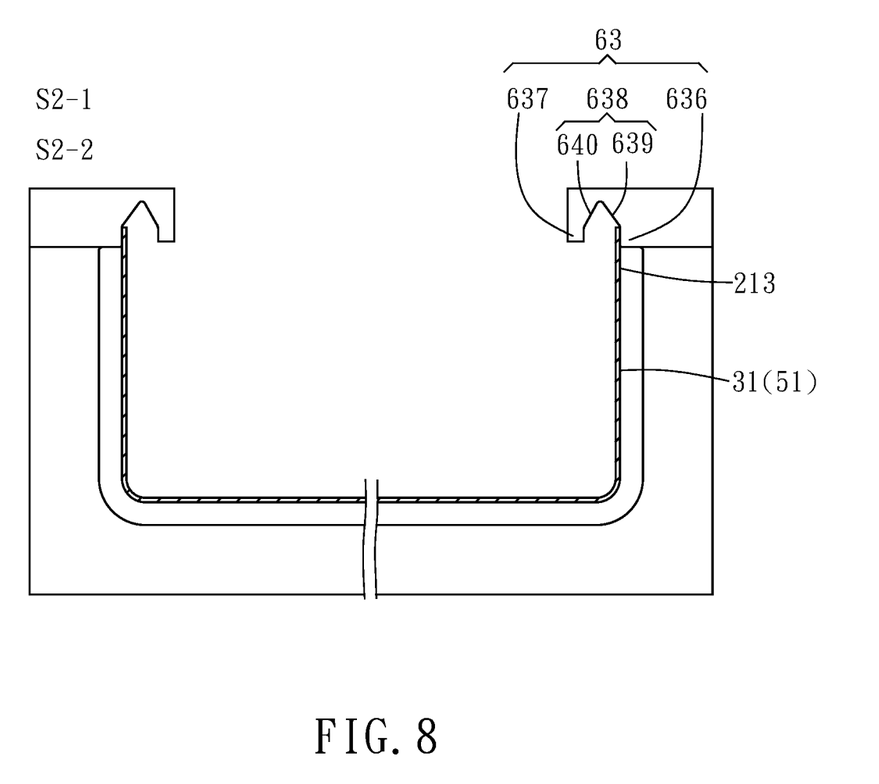
FIGS. 8 to 12 are schematic diagrams of the manufacturing method of the luggage with composite material integrally formed frame of the present invention, which shows the manufacturing process of the integrated second shell and second frame.

Referring to FIG. 2 and FIGS. 8-12, the manufacturing method of the second shell 30 and the second frame 50 being integrally formed comprises steps S2-1~S2-6, wherein steps S2-1~S2-6 are substantially similar to steps S1-1~S2-6 with differences outlined hereinafter:

Step S2-2: As shown in FIG. 2 and FIG. 8, the frame mold area 63 comprises an inner bump 636, an outer bump 637, and a recessed portion 638. The inner bump 636 protrudes from the inner wall surface of the heating mold 60. The recessed portion 638 is located between the inner bump 636 and the outer bump 637, and the recessed portion 638 is mainly composed of a second inclined surface 639 and a third inclined surface 640 and used for making the protruding engagement member 57. Place the shell edge 213 of the shell 31, 51 on the inner bump 636 and the recessed portion 638. Of course, you can also choose to place the shell edge 213 of the shell 31, 51 on the inner wall surface of the heating mold 60 and adjacent to the inner bump 636 according to your needs.

Figure 9:
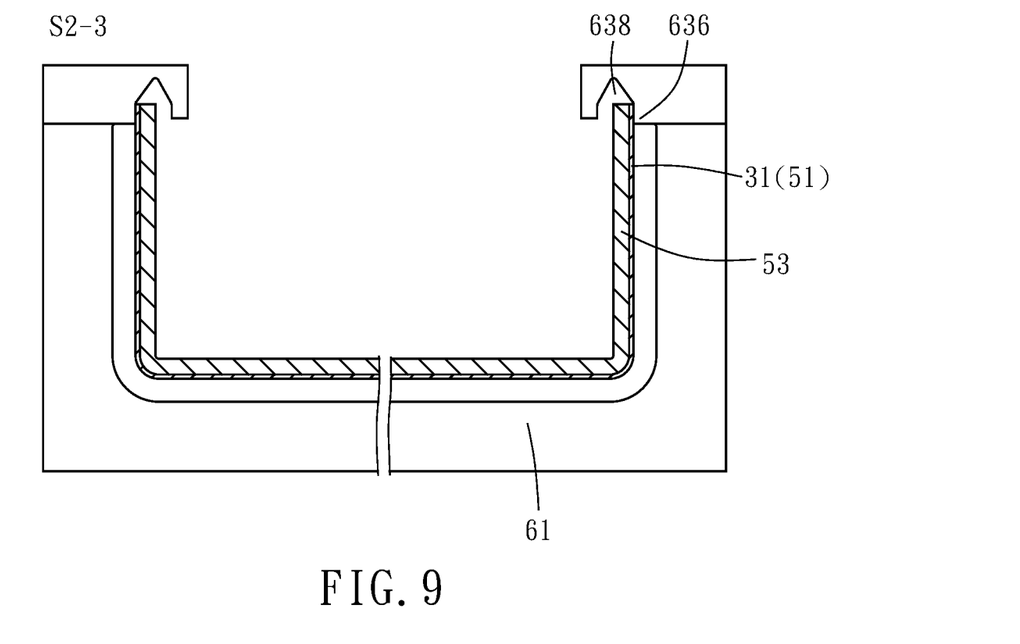

Step S2-3: As shown in FIG. 9, set the outer surface of the thermoset carbon fiber plastic layer 43 on the inner surface of the shell 31,51. Furthermore, a part of the thermoset carbon fiber plastic layer 43 will be placed in the inner concave mold area 61, and the other part will be placed in the inner bump 636 and the recessed portion 638.

Figure 10:
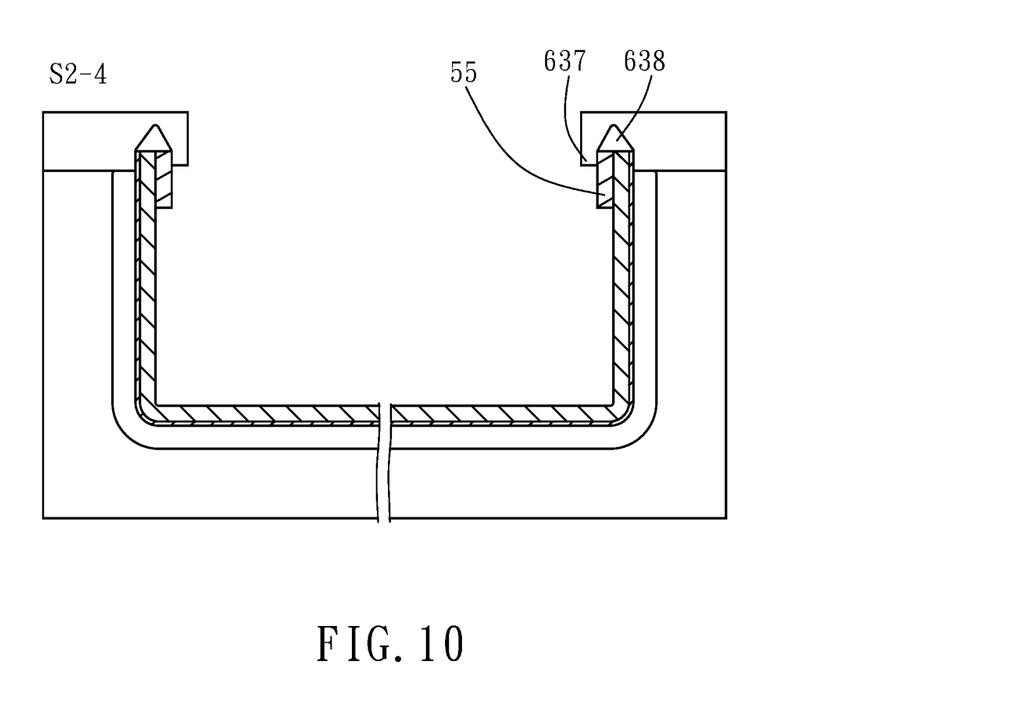

Step S2-4: As shown in FIG. 10, place the filling layer 45 on the recessed portion 638 and adjacent to the outer bump 637.

Figure 11:
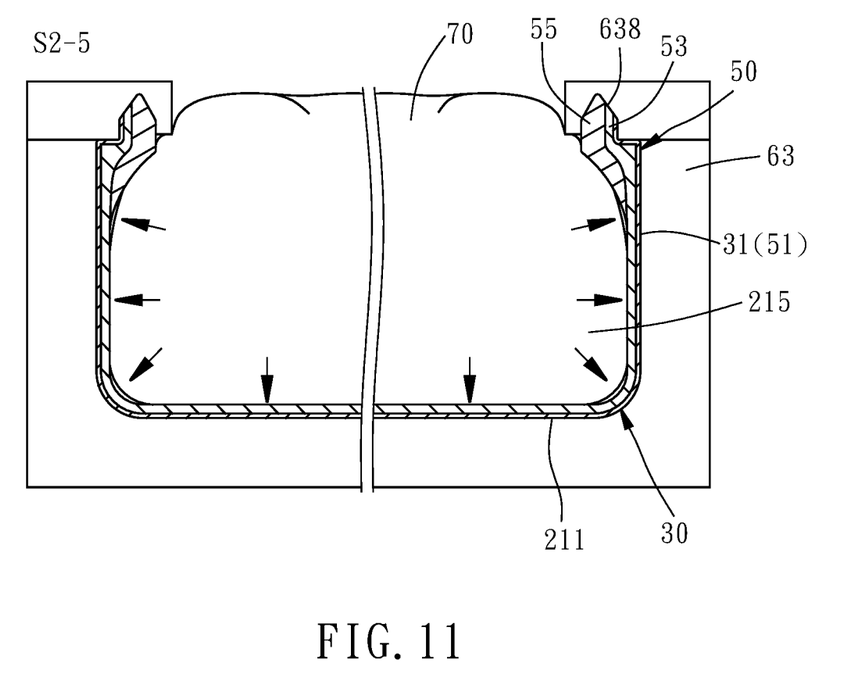

Step S2-5: As shown in FIG. 11, set an air bag 70 in the accommodation area 215 of the shell 31, 61, then expand the air bag 70 to the inner surface of the thermoset carbon fiber plastic layer 43 and the filling layer 45, and then operate the heating mold 60 to heat the shell body 211 and the thermoset carbon fiber plastic layer 43 in the inner concave mold area 61 and thermoset carbon fiber plastic layer 43 and the filling layer 45 in the frame mold area 63, so that the shell 31, 51, the thermoset carbon fiber plastic layer 43 and the filling layer 45 are combined with each other and extruded into the recessed portion 638 of the frame mold area 63, and thus, the thermoset carbon fiber plastic layer 43 and the filling layer 45 are cured and bonded to the inner surface of the shell 31, 51, and the shell 31, 51, the thermoset carbon fiber plastic layer 43 and the filling layer 45 are combined to form the second shell 30 and the second frame 50 in integrity.

Figure 12:
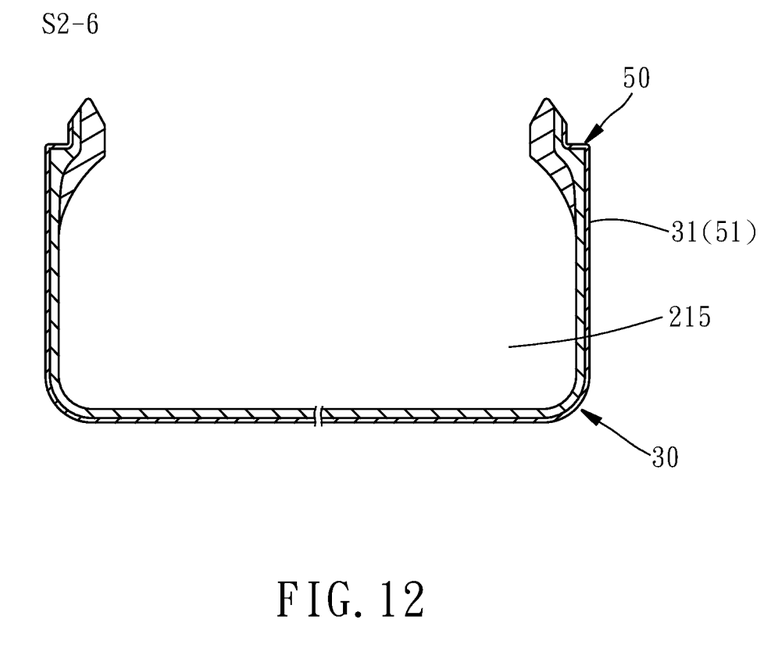

Step S2-6: As shown in FIG. 12, move the air bag 70 out of the accommodation area 215 of the shell 31, 51, and cool the integrated second shell 30 and second frame 50 to complete the manufacturing process of the second shell 30 and second frame 50.

In summary, the luggage with composite material integrally formed frame and manufacturing method thereof of the present invention can obtain an integral shell and frame structure in a one-time mold forming process. The luggage made by this method has the functions of high strength, light weight and high precision, so as to increase the durability of the luggage and improve the fit of the two frames when the two shells are closed.

What is claimed is:
1. A method for manufacturing a luggage with composite material integrally formed frame, comprising:
  A) using a vacuum molding method to make a thermoplastic sheet into a shell, said shell comprising a shell body, a shell edge disposed on an outer edge of said shell body and an accommodation area surrounded by said shell body and said shell edge;
  B) providing a heating mold, said heating mold comprising an inner concave mold area, a frame mold area and an inner wall surface, said frame mold area being located at an outer edge of said inner concave mold area, then placing said shell body in said inner concave mold area to set said shell edge in said frame mold area and to correspond an outer surface of said shell to said inner wall surface of said heating mold;
  C) providing a thermoset carbon fiber plastic layer, and setting an outer surface of said thermoset carbon fiber plastic layer on an opposing inner surface of said shell;

D) providing a filling layer, and attaching said filling layer to an opposing inner surface of said thermoset carbon fiber plastic layer within said frame mold area; and E) setting an air bag in said accommodation area of said shell, and then expanding said air bag to the inner surface of said thermoset carbon fiber plastic layer and said filling layer, and then operating a heating mold to heat said shell body and said thermoset carbon fiber plastic layer in said inner concave mold area and said thermoset carbon fiber plastic layer and said filling layer in said frame mold area, so that said shell, said thermoset carbon fiber plastic layer and said filling layer are combined with each other.

2. The method for manufacturing the luggage with composite material integrally formed frame as claimed in claim 1, wherein in step B) to step D), said frame mold area comprises an inner groove and an outer groove, said inner groove being adjacent to said inner wall surface of said heating mold and spaced apart from said outer groove, and said shell edge of said shell is set in said inner groove, and said thermoset carbon fiber plastic layer and said filling layer are set in said inner groove and said outer groove.

3. The method for manufacturing the luggage with composite material integrally formed frame as claimed in claim 2, wherein in step C) and step D), said thermoset carbon fiber plastic layer is placed in said inner groove, and said filling layer is placed in said inner groove and said outer groove.

4. The method for manufacturing the luggage with composite material integrally formed frame as claimed in claim 2, wherein said inner groove of said frame mold area is composed of a flat surface, an inclined surface and said inner wall surface of said heating mold, said flat surface having two opposite lateral sides thereof respectively connected to said inner wall surface and said inclined surface.

5. The method for manufacturing the luggage with composite material integrally formed frame as claimed in claim 1, wherein in step B) to step D), said frame mold area comprises an inner bump, an outer bump and a recessed portion, said inner bump protruding from said inner wall surface of said heating mold, said recessed portion being located between said inner bump and said outer bump; said shell edge of said shell and said thermoset carbon fiber plastic layer are placed on said inner bump and said recessed portion, and said filling layer is placed on said recessed portion and said outer bump.

6. The method for manufacturing the luggage with composite material integrally formed frame as claimed in claim 5, wherein said recessed portion of said frame mold area is mainly composed of a second inclined surface connected to a third inclined surface.

7. The method for manufacturing the luggage with composite material integrally formed frame as claimed in claim 1, wherein said filling layer is thermosetting carbon fiber plastic.

8. The method for manufacturing the luggage with composite material integrally formed frame as claimed in claim 1, wherein in step E), after said thermoset carbon fiber plastic layer and said filling layer are heated by said heating mold, said thermoset carbon fiber plastic layer and said filling layer are fused and cured and adhered to the inner surface of said shell.

9. The method for manufacturing the luggage with composite material integrally formed frame as claimed in claim 1, wherein in step A), said thermoplastic sheet is a transparent material.

10. The method for manufacturing the luggage with composite material integrally formed frame as claimed in claim 1, wherein in step A), said vacuum molding method is to provide a vacuum molding device with a mold, and then put said thermoplastic sheet into said vacuum molding device for heating and softening, so that said vacuum molding device generates a negative pressure to make said thermoplastic sheet adhere to the surface of said mold to form said shell.

11. The method for manufacturing the luggage with composite material integrally formed frame as claimed in claim 1, further comprising step F) after step E) to move said air bag out of said accommodation area, and cool the integrated said shell and said frame.

\* \* \* \* \*